I. PATRICK.
CLUTCH.
APPLICATION FILED APR. 15, 1916.
1,227,191.
Patented May 22, 1917.
3 SHEETS—SHEET 1.
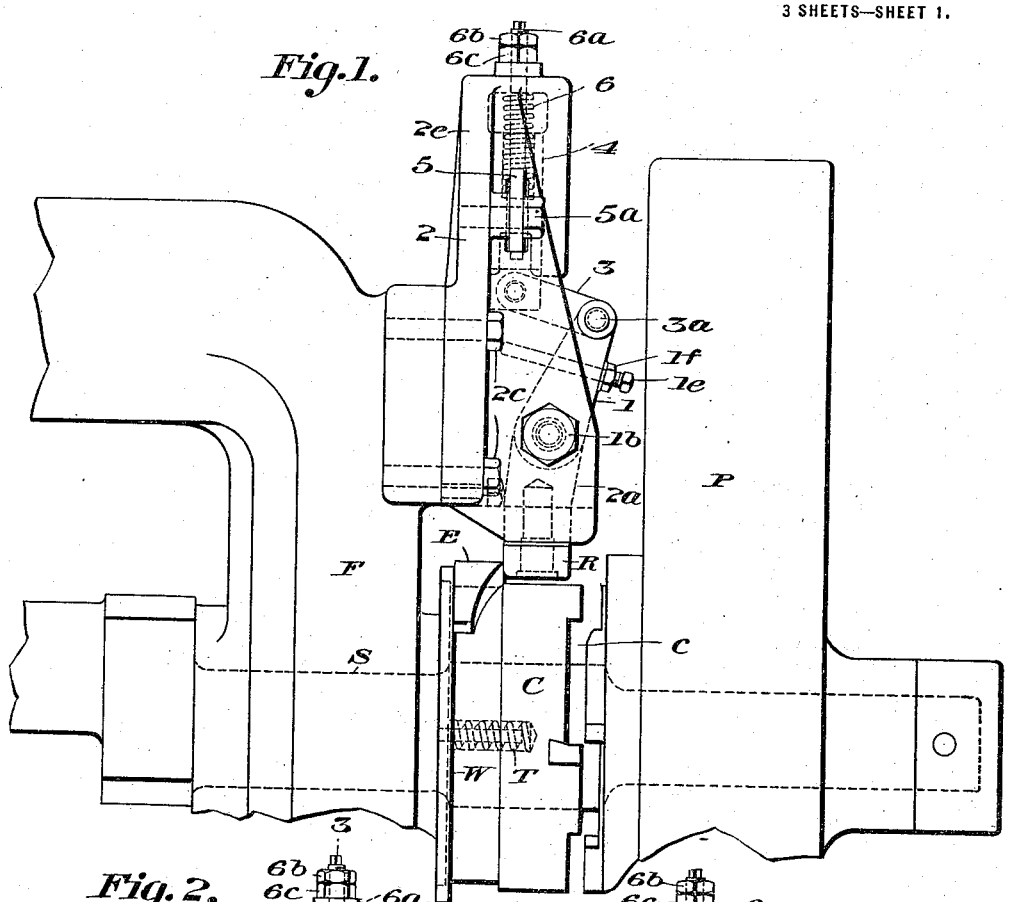
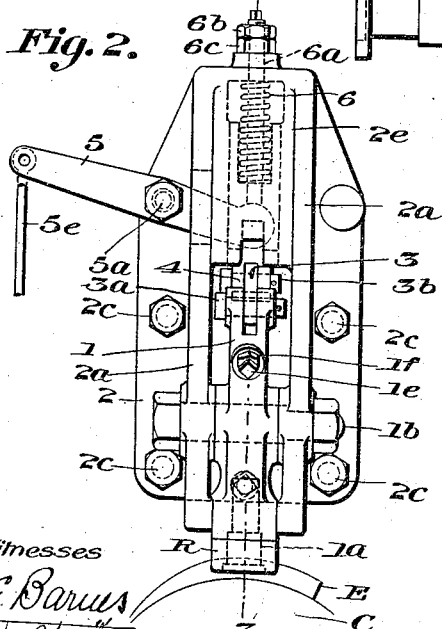
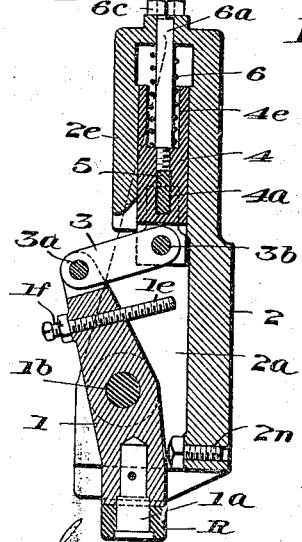
Witnesses
Inventor
Isaac Patrick
By Alexander & Dowell Attys.

I. PATRICK.
CLUTCH.
APPLICATION FILED APR. 15, 1916.

1,227,191.

Patented May 22, 1917.
3 SHEETS—SHEET 2.

Witnesses
Philip E. Barnes

Isaac Patrick, Inventor
By Alexander & Powell
Attys.

I. PATRICK.
CLUTCH.
APPLICATION FILED APR. 15, 1916.

1,227,191.

Patented May 22, 1917.
3 SHEETS—SHEET 3.

UNITED STATES PATENT OFFICE.

ISAAC PATRICK, OF HASTINGS, MICHIGAN, ASSIGNOR TO CONSOLIDATED PRESS COMPANY, OF HASTINGS, MICHIGAN, A CORPORATION OF MICHIGAN.

CLUTCH.

1,227,191.

Specification of Letters Patent.

Patented May 22, 1917.

Application filed April 15, 1916. Serial No. 91,319.

*To all whom it may concern:*

Be it known that I, ISAAC PATRICK, a subject of the King of Great Britain and Ireland, residing at Hastings, in the county of Barry and State of Michigan, have invented certain new and useful Improvements in Clutches; and I hereby declare that the following is a full, clear, and exact description thereof, reference being had to the accompanying drawings, which form part of this specification.

This invention is a novel improvement in clutch operating devices particularly adapted for use in connection with clutches in which one clutch member is slidable, and is adapted to be disengaged from the other, relatively fixed, clutch member by means of a cam on said slidable clutch member contacting with a relatively stationary abutment; and the present invention has particular reference to the abutment and means for operating same whereby the abutment may at the will of the operator be moved into position to cause the disengagement or release of the clutch.

The invention is particularly designed for use with that type of clutches which are commonly employed on metal stamping presses and punching machines, wherein it is desired to throw the clutch out of engagement at each rotation of the driving shaft; the operation of the clutch being under the control of the operator; and although the driving pulley or gear may be driven continuously the mechanism will operate only when the clutch is engaged.

I will explain the invention with reference to the accompanying drawings which illustrate several embodiments of the invention, and will enable others skilled in the art to readily adopt and use the invention in connection with various types of clutches, and on various kinds of machines. In the claims following the description I summarize the essential features of the invention and novel combinations of parts for which protection is desired.

In said drawings:

Figure 1 is a side elevation of my novel clutch controlling mechanism as applied to the driving clutch mechanism of a stamping press or like machine.

Fig. 2 is a front view of the clutch-disengaging mechanism.

Fig. 3 is a vertical sectional view through such mechanism on line 3—3 Fig. 2.

Figure 4:
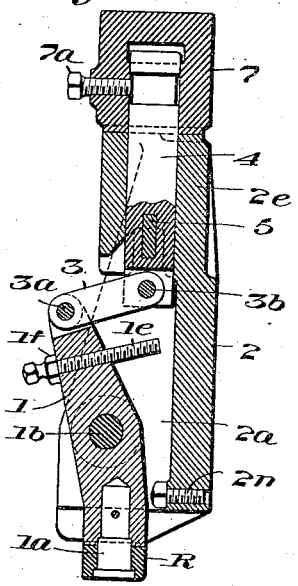
Fig. 4 is a view similar to Fig. 3, showing how a weight may be used in place of a spring.

Referring to the drawings, F designates the frame of the machine or press; S the main shaft thereof; P the driving pulley which has a clutch face or member $c$ on its hub adapted to be engaged by an opposed clutch face of a clutch C slidably mounted upon the shaft S and splined thereto in the usual manner; this clutch member having a cam E attached to its periphery which is adapted to engage a roller R attached to the abutment of my novel cam controlling devices hereinafter described.

Preferably collar C is chambered on the side next to the frame F and springs T are interposed in said recesses between the cam and a washer or collar W on the shaft S adjacent the frame, the said springs normally pressing the clutch C toward the pulley P, so as to engage it with clutch $c$ and lock the pulley to the shaft and cause the shaft to turn with the pulley; but when the cam E is engaged with the abutment or roller R as indicated in Fig. 1 the clutch is disengaged. Thus far the parts are well known and need no more detailed explanation or description, as the present invention has particular reference to the means whereby the roller R or abutment, is moved into or out of operative position to engage or disengage cam E and thus cause engagement or disengagement of the clutch C with the pulley P.

In the example shown in Fig. 1 roller R is preferably journaled on a stud or pin $1^a$ screwed or rigidly held in the lower end of an oscillating lever 1 which is fulcrumed on a bolt $1^b$ which is supported by and between parallel flanges $2^a$ on the face of a casting 2 which is secured to the frame F in correct relation to the shaft S by means of bolts $2^c$, or in other suitable manner, in such position as to support roller $1^a$ close to the periphery of the clutch C and normally in position to be engaged by the face of the cam E. The upper end of the lever 1 is preferably pivotally connected to one end of a link 3 by a bolt $3^a$ and the other end of this link 3 is pivotally connected by a bolt $3^b$ to the lower end of a slidable member 4 which is guided in a housing $2^e$ formed on the casting 2, and the lower end of this member 4 is provided with a slot $4^a$ which is engaged by the inner end of a lever 5 pivoted on a stud bolt $5^a$ attached to the face of casting 2. The outer end of this lever 5 may be operated by hand, or may be connected by a rod $5^e$ to any suitable operating device, preferably to a treadle, so that by pulling down on the rod $5^e$ the lever can be depressed and thus move member 4, and by means of links 3 oscillate lever 1 and withdraw roller R from cam E, thus permitting the springs T to throw the clutch C into engagement with the clutch member $c$ on pulley P and thereby cause shaft S to turn with pulley P until the roller R is returned to position to engage cam E and cause clutch C to disengage the pulley.

The member 4 is preferably held in depressed position by its weight and by means of a spring 6 which may be interposed between the member 4 and the upper end of the housing $2^e$ in which member 4 is confined. As shown member 4 has a socket $4^e$ in its upper end through which extends a rod $6^a$, the lower end of which is fast to the member 4 while its upper end extends through an opening in the top of the housing $2^e$ and is threaded for engagement of locking and jam nuts $6^c$, $6^b$. A spring 6, preferably a helical expansion spring, may be strung on rod $6^a$ between the bottom of socket $4^e$ and the top of the housing $2^e$. The downward or inward movement of member 4 in the example shown may be limited or adjusted by nuts $6^c$, $6^b$ so that when member 4 is in lowermost position the roller R will be held in position to engage the cam E and thus insure proper disengagement of the clutch member C from the pulley P.

Wear on the clutch C cam E and roller R can be compensated for by adjusting the nuts $6^c$, $6^b$ thus limiting the descent of the member 4 and thereby the normal position of the roller R.

The extent of upward movement of the member 4, and consequent inward swing of the upper end of lever 1, may be controlled by a bolt $1^e$ tapped through the upper end of lever 1 below the link and adapted to engage the face of the casting 2, said bolt being provided with a jam nut $1^f$. The extent of movement of the lever 1 in the opposite direction may be limited by an adjustable bolt or stop $2^n$ tapped into an opening in the lower end of casting 2 as shown.

In the modification shown in Fig. 4 the member 4 is extended through the top of the housing $2^e$ and is provided with a weight 7 on its upper end, such weight being loosely confined to the member 4 by means of a bolt $7^a$ tapped through the weight $4^e$ in the projecting end of the bolt; the weight and the spring have exactly the same effect. The weight may be adjusted on the bolt to limit the descent of member 4.

Figure 5:
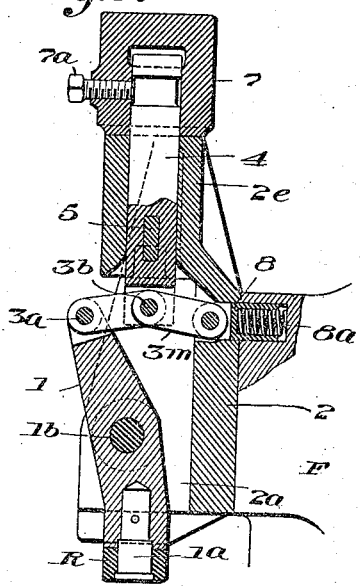
Fig. 5 is a view similar to Fig. 4 showing how toggle links might be used.

The general construction shown in Fig. 5 is the same as that shown in Fig. 4 but in this instance an additional link $3^m$ is pivoted on the bolt $3^b$ and in turn pivoted to the outer end of a slidable plunger 8 mounted in a socket in the casting 2 and adjacent portion of the frame F. A cushioning spring $8^a$ may be placed in the plunger 8, as shown.

Figure 6:
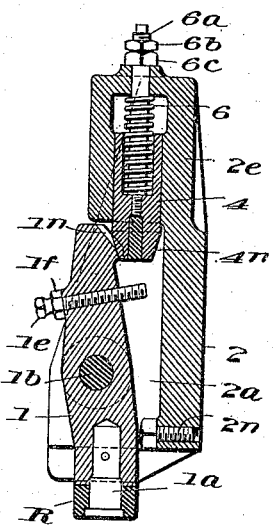
Fig. 6 is a vertical sectional view of another modification, on the line 6—6, Fig. 8.
Figure 7:
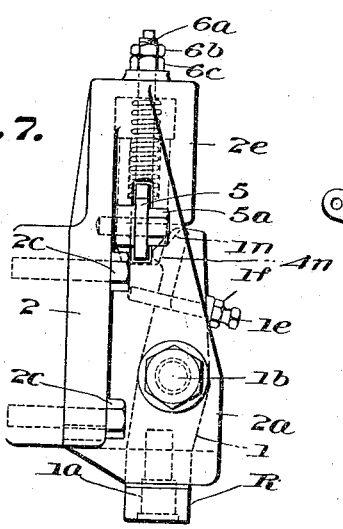
Fig. 7 is a side view of the mechanism shown in Fig. 6.
Figure 8:
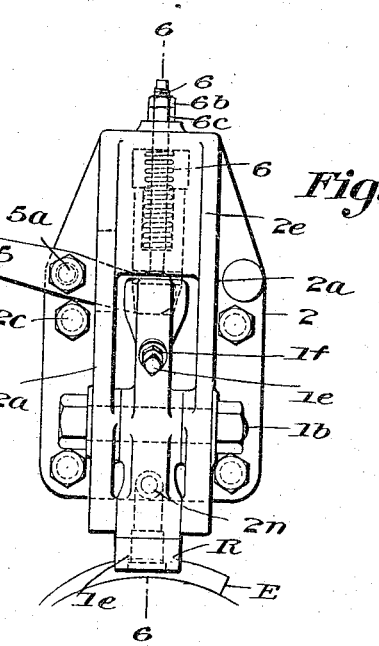
Fig. 8 is a face view of the mechanism shown in Fig. 7.

The construction shown in Figs. 6, 7 and 8 is in general similar to that above described, but instead of using a link or toggle, the member 4 has a tapered or beveled lower end $4^n$ and the upper end of lever 1 has an oppositely beveled portion $1^n$ which is adapted to engage the beveled end $4^n$; of member 4 so that when member 4 is depressed the upper end of $1^n$ will be forced outward and roller R will be held in position to engage cam E and cause clutch C to disengage the pulley P. The descent of plunger $4^n$ is regulated by means of adjusting nuts $6^c$, $6^b$; the taper or bevel on the opposed faces $4^n$ and $1^n$ of member 4 and lever 1 is such that they will be practically locked against movement by pressure exerted on roller R, and will hold it firmly when the cam is engaged with said roller to disengage the clutch; and yet will permit easy lifting of member 4 when it is desired to release the clutch.

Figure 9:
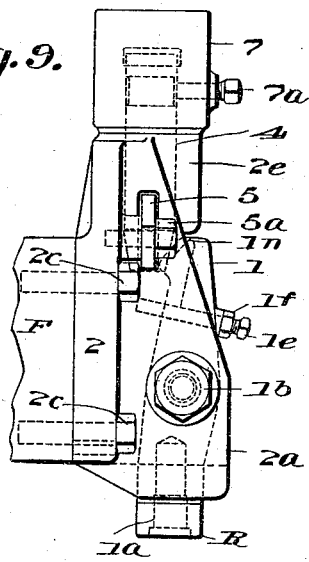
Fig. 9 is a side view of another modification.
Figure 10:
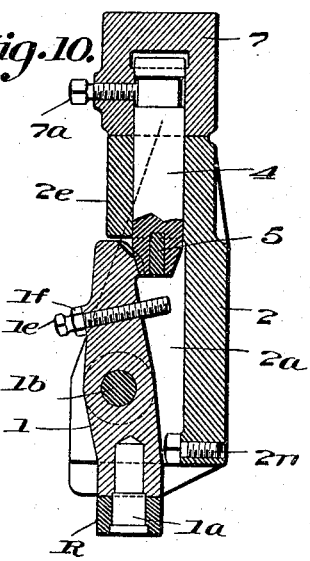
Fig. 10 a sectional view of the mechanism shown in Fig. 9.

The construction shown in Figs. 9 and 10 is similar to that shown in Fig. 8; with a weight 7 in place of the spring; the operation of the parts being identical, and the weight being utilized as a stop collar for adjusting the plunger or member 4.

Figure 11:
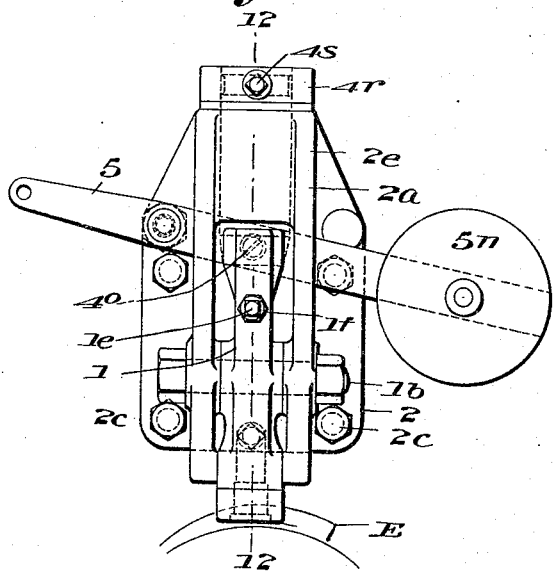
Fig. 11 is a front view of another modification.
Figure 12:
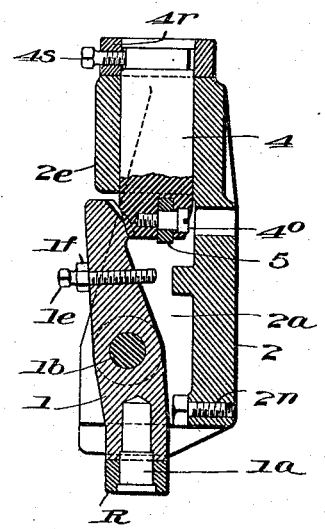
Fig. 12 is a sectional view on line 12—12 Fig. 11.

The construction shown in Figs. 11 and 12 is substantially the same as that above described; similar parts being similarly lettered; but the lever 5 is pivotally connected to the lower end of member 4 by means of a bolt $4^o$; and the end of this lever opposite the pull is provided with an adjustable weight $5^n$ which may be used in place of or in addition to the spring or weight above described to hold the beveled end $4^n$ of member 4 in engagement with the beveled end $1^n$ of the lever 1. The member 4 may be adjusted by means of a collar $4^r$ attached to its upper end by means of a bolt $4^s$.

In the operation of this device the pulley P is driven by suitable belting or gearing; in the normal position of the parts the clutch is held out of engagement by reason of the cam E engaging with roller R. If the operator desires to have the shaft S operated he can oscillate lever 1 by raising member 4 by a pull on the lever 5 as described so as to oscillate said lever in a direction to move roller R toward the pulley P and the springs T will cause clutch C to follow up roller R and engage the face c on pulley P thus causing the shaft to turn with the pulley and this causes the shaft to revolve. If the lever 5 is released however immediately after the cam E has passed the spring will return member 4 through its connection and lever 1 and roller R into the position shown in Fig. 1 so that as the shaft continues its rotation in the example shown the cam E engages roller R and forces the clutch C to disengage the pulley and the shaft will cease to revolve after making one rotation while the pulley continues to rotate, the clutch being disengaged. If more than one revolution is desired before stopping the shaft from revolving the operator can hold the member 4 raised by keeping down the treadle and therefore the clutch will not be engaged, but when the operator releases the treadle or member 4 the lever 1 will be immediately returned into position to cause roller R to engage cam E to disengage the clutch.

The employment of springs or weights are considered mechanical equivalents and either or both may be used as preferred. In large clutches the weight of the member 4 itself might be sufficient but the descent of such member would be quickened by addition of a spring. I do not consider the invention restricted to any of the specific constructions shown; nor have I attempted to show all the various modifications or embodiments of the construction thereof which might be made within the scope thereof; and which might embody the essential features of the invention while varying the form or external appearance thereof.

What I claim is:

1. In combination a clutch member, an abutment adjacent said clutch member and adapted to be oscillated into and out of position to contact with said clutch member, means adapted to hold the abutment normally in position to engage said clutch member and cause disengagement of the clutch, and means for oscillating said abutment to permit the engagement of the clutch.

2. In combination with a clutch member, an abutment, pivoted adjacent the clutch, and adapted to be oscillated into and out of position to contact with said clutch member, a slidable member adapted in normal position to hold said abutment in position to cause disengagement of the clutch, and means for moving said member to permit engagement of the clutch.

3. In combination with a clutch having a member provided with a cam, an abutment pivoted adjacent the clutch and adapted to be oscillated into and out of position to contact with said cam to cause disengagement of the clutch when in contact with said cam, a slidable member adapted to oscillate the abutment and to hold it in normal position to cause disengagement of the clutch member, and means for operating said slidable member.

4. In combination with a clutch member, a lever, pivoted beside the clutch and having its inner end adapted to be oscillated into and out of position to contact with said clutch member to disengage the clutch, when in contact with said member, means adapted to hold the outer end of the lever and cause disengagement of the clutch, and means for shifting said holding means to permit engagement of the clutch.

5. In combination with a clutch member, a lever, pivoted adjacent the clutch member and having its inner end adapted to be oscillated into and out of position to contact with said clutch member to disengage the clutch when in contact therewith, a slidable member adjacent the other end of the lever and adapted in one position to hold said lever in such position as to cause disengagement of the clutch, and means for withdrawing said member to permit engagement of the clutch.

6. In combination with a clutch having a member provided with a cam; a lever pivoted adjacent the clutch and having one end adapted to be oscillated into and out of position to contact with said cam to cause disengagement of the clutch when in contact therewith, a slidable member adapted to engage the other end of said lever to hold it in position to cause disengagement of the clutch, and means for operating said member.

7. In combination with a clutch having a slidable member, a lever pivoted beside the clutch and having its inner end adapted to be oscillated into and out of position to contact with said member to cause it when in contact therewith to disengage the clutch, a second slidable member adapted to hold the inner end of the lever normally in position to cause disengagement of the clutch, and means for shifting said second member to permit the engagement of the clutch.

8. In combination with a clutch having a slidable member provided with a peripheral cam, a lever pivoted adjacent the clutch and having one end adapted to be oscillated into and out of position to contact with the cam to cause, when in contact therewith, disengagement of the clutch; a second slidable member adapted to engage the other end of said lever to hold it in position to cause disengagement of the clutch, and means for withdrawing said member so as to permit engagement of the clutch.

9. In combination with clutch members, an abutment adapted to be oscillated into and out of position to contact with a clutch member normally to disengage the clutch, a vertically movable member adapted to move said abutment into clutch disengaging position, and means for operating said vertically movable member.

10. In combination with a clutch having a member provided with a cam, and a pivoted abutment adapted to be oscillated into and out of position to contact with said cam to cause normal disengagement of the clutch, a slidable member, and a connection between said slidable member and said abutment, substantially as described.

11. In combination with a clutch having a slidable member provided with a cam, a movable abutment adapted to be oscillated into and out of position to contact with said cam to cause disengagement of the clutch, a second slidable member, and a link connection between said second slidable member and said abutment, substantially as described.

12. In combination with a clutch having a slidable member, a lever pivoted adjacent the member having one end adapted to be oscillated into and out of position to contact with the slidable member to disengage the clutch; a link connected with the other end of said lever, and means connected with said link whereby the lever may be shifted into or out of operative position.

13. In combination with a clutch having a slidable member provided with a cam, a lever pivoted adjacent the member and having one end adapted to be oscillated into and out of position to contact with the cam to cause disengagement of the clutch, a second slidable member adjacent the free end of the lever, and a link connection between the second slidable member and the free end of the lever.

14. In combination with a clutch having a slidable member provided with a cam, a lever pivoted adjacent the member having one end adapted to be oscillated into and out of position to contact with the cam to disengage the clutch; a second movable member, a link connecting said second member and said lever whereby the lever may be shifted into or out of operative position.

15. In combination with a clutch having a slidable member provided with a cam, a pivoted lever adjacent the clutch having one end adapted to be oscillated into and out of position to contact with the cam and cause disengagement of the clutch, a second slidable member adjacent the free end of the lever, a link connection between the second slidable member and the free end of the lever, and means for moving said second slidable member to shift the lever.

16. In combination with a clutch member, an abutment pivoted adjacent the clutch and adapted to be oscillated into and out of position to contact with the clutch member to disengage the clutch, a slidable member adapted in one position to hold said abutment in position to cause disengagement of the clutch, means for moving said slidable member to permit engagement of the clutch, and means for regulating the engaging position of the said abutment.

17. In combination with a clutch member, a lever, pivoted adjacent the clutch having its inner end adapted to be oscillated into and out of position to contact with the clutch member to disengage the clutch, a slidable member adjacent the other end of the lever and adapted in one position to hold said lever in such position as to cause disengagement of the clutch, means for adjusting the slidable member to compensate for wear, and means for withdrawing said slidable member to permit engagement of the clutch.

18. In combination with a clutch having a member provided with a cam, a pivoted abutment adapted to be oscillated into and out of position to contact with the cam to cause disengagement of the clutch, a slidable member, means for adjusting the parts to compensate for wear, and a connection between said slidable member and said abutment.

19. In combination with a clutch having a slidable member provided with a cam, a lever pivoted adjacent the member having one end adapted to be oscillated into and out of position to contact with the cam to disengage the clutch, a movable member, a link connecting said movable member and said lever whereby the lever may be shifted into or out of operative position, and adjusting means to compensate for wear.

In testimony that I claim the foregoing as my own, I affix my signature.

ISAAC PATRICK.

Copies of this patent may be obtained for five cents each, by addressing the "Commissioner of Patents, Washington, D. C."